(12) United States Patent
Sato

(10) Patent No.: US 7,210,028 B2
(45) Date of Patent: Apr. 24, 2007

(54) HARDWARE MANAGEMENT APPARATUS

(75) Inventor: Kazuyuki Sato, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 929 days.

(21) Appl. No.: 10/004,888

(22) Filed: Dec. 7, 2001

(65) Prior Publication Data

US 2002/0103891 A1    Aug. 1, 2002

(30) Foreign Application Priority Data

Jan. 31, 2001    (JP) .............................. 2001-023354

(51) Int. Cl.
*G06F 9/44*    (2006.01)
(52) U.S. Cl. ........................ 713/1; 235/380; 235/381; 705/50; 705/51; 705/57; 716/4; 716/5; 717/170
(58) Field of Classification Search .................... 713/1; 705/57, 50, 51; 235/380, 381; 716/1, 4, 716/15
See application file for complete search history.

(56) References Cited

U.S. PATENT DOCUMENTS

| | | | | | |
|---|---|---|---|---|---|
| 5,590,306 | A | * | 12/1996 | Watanabe et al. | 711/115 |
| 5,699,549 | A | * | 12/1997 | Cho | 711/115 |
| 5,867,579 | A | * | 2/1999 | Saito | 705/57 |
| 5,923,856 | A | * | 7/1999 | Hazama et al. | 710/300 |
| 6,182,191 | B1 | * | 1/2001 | Fukuzono et al. | 711/111 |
| 6,230,195 | B1 | * | 5/2001 | Sugawara et al. | 709/220 |
| 6,363,456 | B1 | * | 3/2002 | Nakano | 711/103 |
| 6,438,694 | B2 | * | 8/2002 | Saito | 713/189 |
| 6,449,717 | B1 | * | 9/2002 | Saito | 713/161 |
| 6,661,772 | B2 | * | 12/2003 | Matsuno et al. | 370/216 |
| 6,687,784 | B2 | * | 2/2004 | Douniwa et al. | 711/103 |
| 6,789,197 | B1 | * | 9/2004 | Saito | 713/193 |
| 6,806,972 | B1 | * | 10/2004 | Daddis et al. | 358/1.1 |
| 6,907,407 | B1 | * | 6/2005 | Yamanoue et al. | 705/57 |

FOREIGN PATENT DOCUMENTS

| | | |
|---|---|---|
| JP | 60-167752 | 8/1985 |
| JP | 63-59605 | 3/1988 |
| JP | 3-26450 | 2/1991 |
| JP | 5-88724 | 4/1993 |

(Continued)

OTHER PUBLICATIONS

Microsoft Corporation, "Microsoft Windows 98 Resource Kit", ISBNI-57231-644-6, pp. 1183, 1213 and 1265 (1998).

*Primary Examiner*—A. Elamin
(74) *Attorney, Agent, or Firm*—Finnegan, Henderson, Farabow, Garrett & Dunner, L.L.P.

(57) ABSTRACT

A hardware management apparatus of this invention has at least one semiconductor integrated circuit component which includes a plurality of semiconductor components, and a first memory for storing first management information used to manage the mount states of the plurality of semiconductor components, at least one circuit board which includes the at least one semiconductor integrated circuit component, and a second memory for storing second management information used to manage the mount state of the at least one semiconductor integrated circuit component, and a third memory for storing third management information used to manage the mount state of the at least one circuit board, and rewrites the corresponding first management information to third management information when the mount state of hardware is changed, thus managing the hardware.

6 Claims, 10 Drawing Sheets

FOREIGN PATENT DOCUMENTS

| | | |
|---|---|---|
| JP | 6-169042 | 6/1994 |
| JP | 6-268042 | 9/1994 |
| JP | 10-180594 | 7/1998 |
| JP | 2000-35991 | 2/2000 |
| JP | 2000-48066 | 2/2000 |
| JP | 2000-56810 A | 2/2000 |
| JP | 2000-66705 A | 3/2000 |
| JP | 2000-311084 A | 11/2000 |
| JP | 2002-536726 A | 10/2002 |

\* cited by examiner

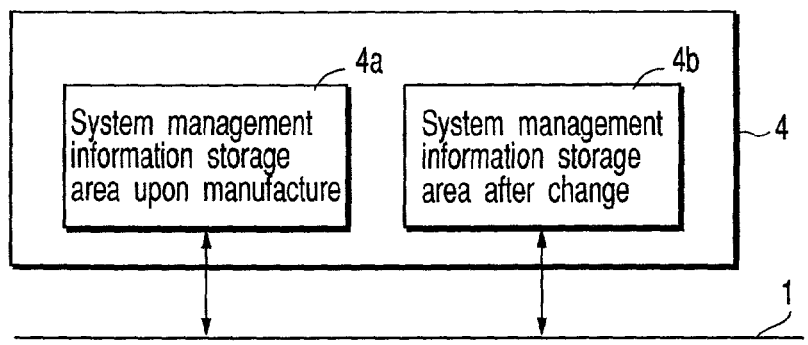

Unique management information
- Quality management information
  - Manufacture number
  - Manufacturer name
  - Manufacture date
  - Tast program number upon delivery
  - System change history
  - System configuration device name
  - Device change history
  - Printed circuit board name that configures system
  - Change history of printed circuit board
  ⋮
- Function managemant information
  - Maximum operation speed
  - Main memory size
  - External memory size
  - Maximum transfer rate
  ⋮

FIG. 4

Change management information
- Change information of main memory size
- Change information of connected device
- Change information of printed circuit board
⋮

Change management information
— Expanded component name
— Expanded memory size
— Change date

FIG. 7

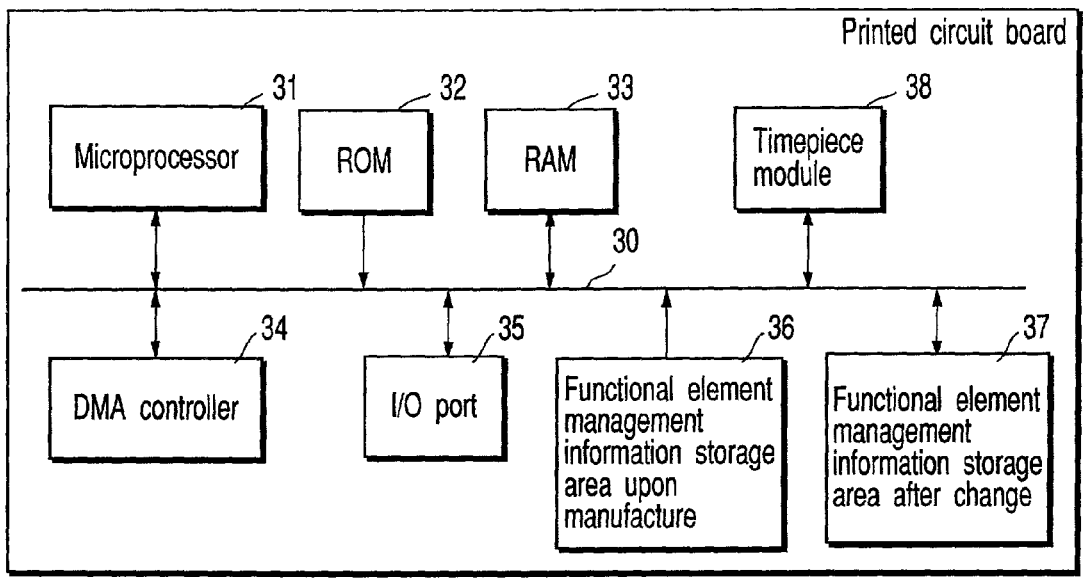

FIG. 8

Unique management information
{
  Quality management information
  — Manufacture number
  — Manufacturer name
  — Manufacture date
  — Tast program number upon delivery
  — Change history
  — Functional element name Function management information
  — Data associated with microprocessor 31 (address width, data width, number of interrupt ports, etc.)
  — Data associated with RAM 33 (memory size, I/O data width, access time, etc.)
  — Data associated with with DMA controller 34 (number of channels, ···, etc.)
}

FIG. 9

| | | | |
|---|---|---|---|
| System management information | Quality management information | System manufacture number<br>Manufacturer name<br>Manufacture number<br>⋮ | : XYZ-1234<br>: AB company<br>: Y-th month Z-th day, 19XX |
| | Function management information | Maximum operation speed<br><br>External memory size<br>⋮ | : 500MHz<br>: 64MB<br>: 6GB |
| | Change management information | Main memory size<br>Connected device<br>⋮ | : 64MB→128MB<br>: DVD drive added |
| Management information of printed circuit board 1 | Quality management information | Manufacture number<br>Manufacturer name<br>⋮ | : ABCD-1434<br>: ＸＸ社 |
| | Function management information | Memory size<br>Maximum operation clock speed<br>⋮ | : 32MB<br>: 333MHz |
| | Change management information | Maximum operation clock speed | : 333MHz→500MHz |
| Management information of printed circuit board 2 | ⋮ | ⋮ | |
| | ⋮ | ⋮ | |
| | ⋮ | ⋮ | |

FIG. 14

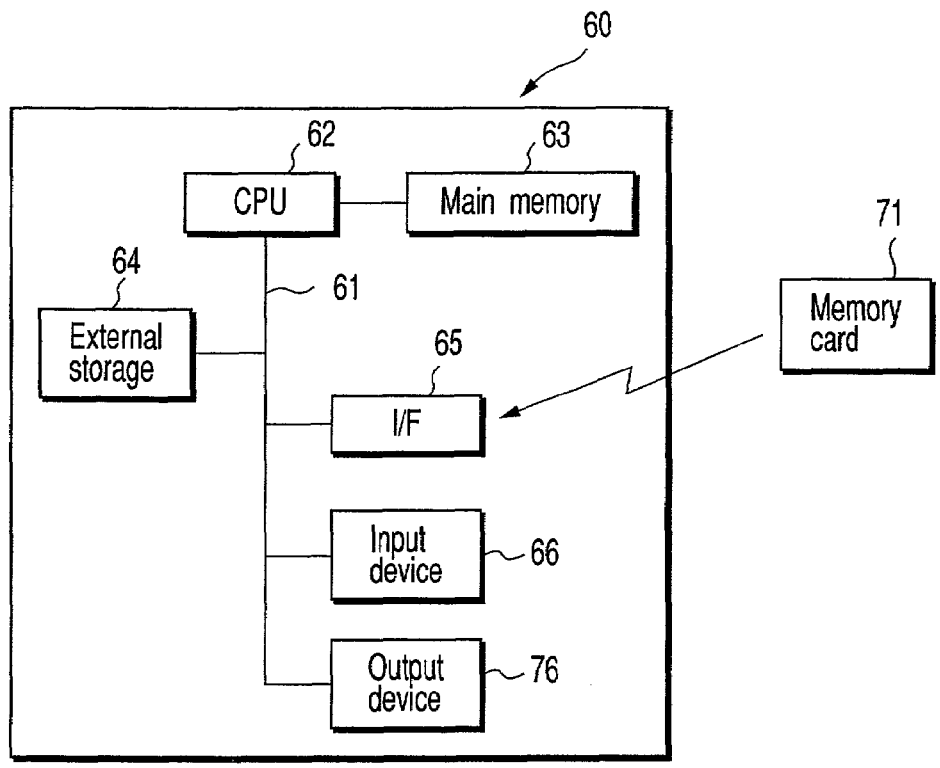
F I G. 15
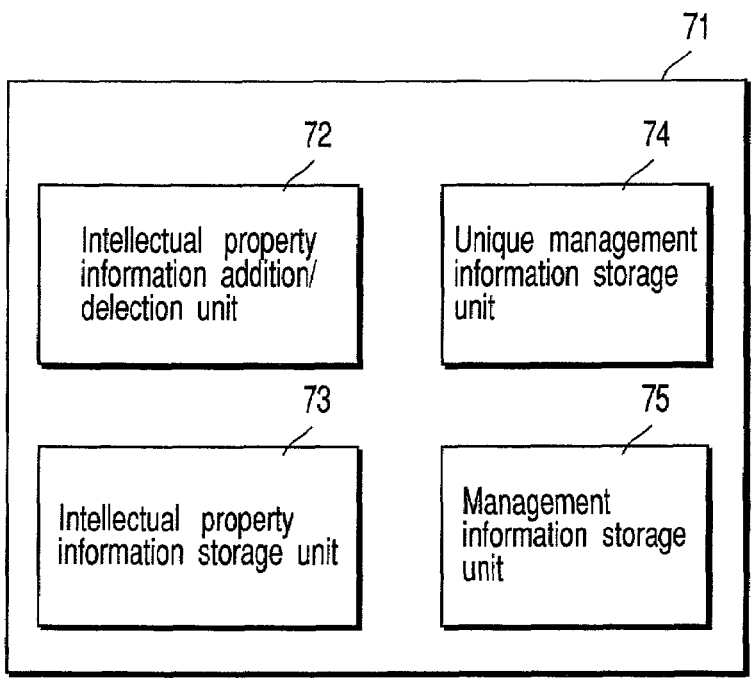
F I G. 16

HARDWARE MANAGEMENT APPARATUS

CROSS-REFERENCE TO RELATED APPLICATIONS

This application is based upon and claims the benefit of priority from the prior Japanese Patent Application No. 2001-023354, filed Jan. 31, 2001, the entire contents of which are incorporated herein by reference.

BACKGROUND OF THE INVENTION

1. Field of the Invention

The present invention relates to a hardware management apparatus and method for managing hardware.

2. Description of the Related Art

A conventional system management technique manages the software configuration installed in an apparatus, and the versions of software and firmware. In a personal computer, the performance of which is frequently improved by such system management, the user can recognize the currently installed software via an operating system (OS).

By managing software by the operating system, the user can recognize the version of software installed for the purpose of function expansion or existing software, and can determine whether it is fit to communicate with another system or needs a version-up to do so.

When a new external device is connected to a personal computer, firmware must be changed to that which supports I/O of such device. In such case as well, the user checks the version of firmware to determine whether it is fit to connect an external device or needs a version-up to do so.

Such system management information indicating the installed software and firmware is stored in a nonvolatile storage device such as a hard disk drive (HDD), read-only memory (ROM), or the like when the software and firmware are installed. Therefore, the system management information is not erased even after power OFF, thus allowing system management.

In this manner, in the prior art, system management is made on the basis of software and firmware. However, the recent great advance in high-integration circuit technique of hardware has made high-function, multi-function, and high-performance hardware possible.

For this reason, system management of hardware is also required for the following reason.

Conventionally, components and functions correspond to each other like microprocessor components, memory components, parallel I/O components, serial I/O components, timepiece components, direct memory access control components, signal process components, and so forth, and the hardware management side can manage by marking mount states in components.

However, with the advance of the high-integration circuit technique of hardware, a plurality of such components are often combined to form a single component. As a result of high integration, the number of functions included per single component increases, but an apparatus that uses the component does not always use all the functions of the component.

Furthermore, such high-function components are mounted on a printed circuit board, and a plurality of circuit boards construct a system. Upon installing new software or connecting I/O devices, the use state of internal functions of components and use of a circuit board formed by mounting a plurality of such components differ.

For this reason, the component names and functions or board names and functions do not always match unlike the prior art, since the hardware configuration itself changes in correspondence with a change in system.

A system is comprised of software and hardware, and the conventional software-based system management is insufficient to manage the system when the system itself changes upon function expansion by installing new software or connecting new I/O devices.

As related techniques, history information is stored in a storage unit such as an IC card or the like inserted in a product, as disclosed in Jpn. Pat. Appln. KOKAI Publication Nos. 2000-35991 and 2000-48066. Since this history information is that of a communication route of the product, it is different from a hardware management apparatus of the present invention, which stores management information indicating the hardware state.

BRIEF SUMMARY OF THE INVENTION

The present invention is made in consideration of the above situation, and has as its object to provide a hardware management apparatus and method that can systematically manage hardware upon installing new software or connecting new I/O devices.

Therefore, in order to achieve the above object, the first invention of the present invention is directed to a hardware management apparatus comprising at least one semiconductor integrated circuit component which comprises a plurality of semiconductor components, and a first memory for storing first management information used to manage mount states of the plurality of semiconductor components, at least one circuit board which comprises the at least one semiconductor integrated circuit component, and a second memory for storing second management information used to manage a mount state of the at least one semiconductor integrated circuit component, a third memory for storing third management information used to manage a mount state of the at least one circuit board, and management information change means for, when the mount states of the plurality of semiconductor components is changed, rewriting the first management information stored in the first memory to indicate changed mount states of the plurality of semiconductor components, for, when the mount state of the at least one semiconductor integrated circuit component is changed, rewriting the second management information stored in the second memory to indicate the changed mount state of the at least one semiconductor integrated circuit component, and for, when the mount state of the at least one circuit board is changed, rewriting the third management information stored in the third memory to indicate the changed mount state of the at least one circuit board.

According to this invention, not only management information upon manufacture but also management information after a change in hardware can be managed for each building component, thus systematically managing hardware components.

In the first invention, the second invention of the present invention further comprises an IC card having intellectual property information and a management area for storing fourth management information used to manage the intellectual property information, and when a management method of the intellectual property information has been changed, the management information change means rewrites the fourth management information stored in the management area to indicate the changed management information of the intellectual property information.

With this invention, not only hardware but also functional elements of the IC card can be managed.

Furthermore, the third invention of the present invention is directed to a memory card management apparatus comprising a memory card which has a first area for storing intellectual property information, a second area for storing an access condition to the intellectual property information, and a third area for storing a changed access condition, storage means for, when it is instructed to change the access condition to the intellectual property information, storing the changed access condition in the third area, determination means for determining based on the access condition stored in the second area and the changed access condition stored in the third area if access to the intellectual property information stored in the first area is permitted, and access means for, when the determination means determines that access to the intellectual property information is permitted, accessing the intellectual property information.

With this invention, when intellectual property information is used, the access condition for the intellectual property information is stored in the memory card, and the intellectual property information can be managed based on the access condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing a system manager 4;

FIG. 3 shows information stored in a system management information storage area 4a upon manufacture;

FIG. 4 shows information stored in a system management information storage area 4b after change;

FIG. 7 shows change management information of the printed circuit board;

FIG. 8 is a diagram showing an example of a component such as a CPU or the like mounted on the printed circuit board;

FIG. 9 shows information stored in a functional element management information storage area 36 upon manufacture;

FIG. 14 shows a display example of management information;

FIG. 15 is a diagram showing a memory card registration apparatus for managing intellectual property information by attaching a memory card;

FIG. 16 is a diagram showing an information storage unit of a memory card 71;

DETAILED DESCRIPTION OF THE INVENTION

A hardware management apparatus according to an embodiment of the present invention will be described hereinafter with reference to the accompanying drawings.

First Embodiment

Figure 1:
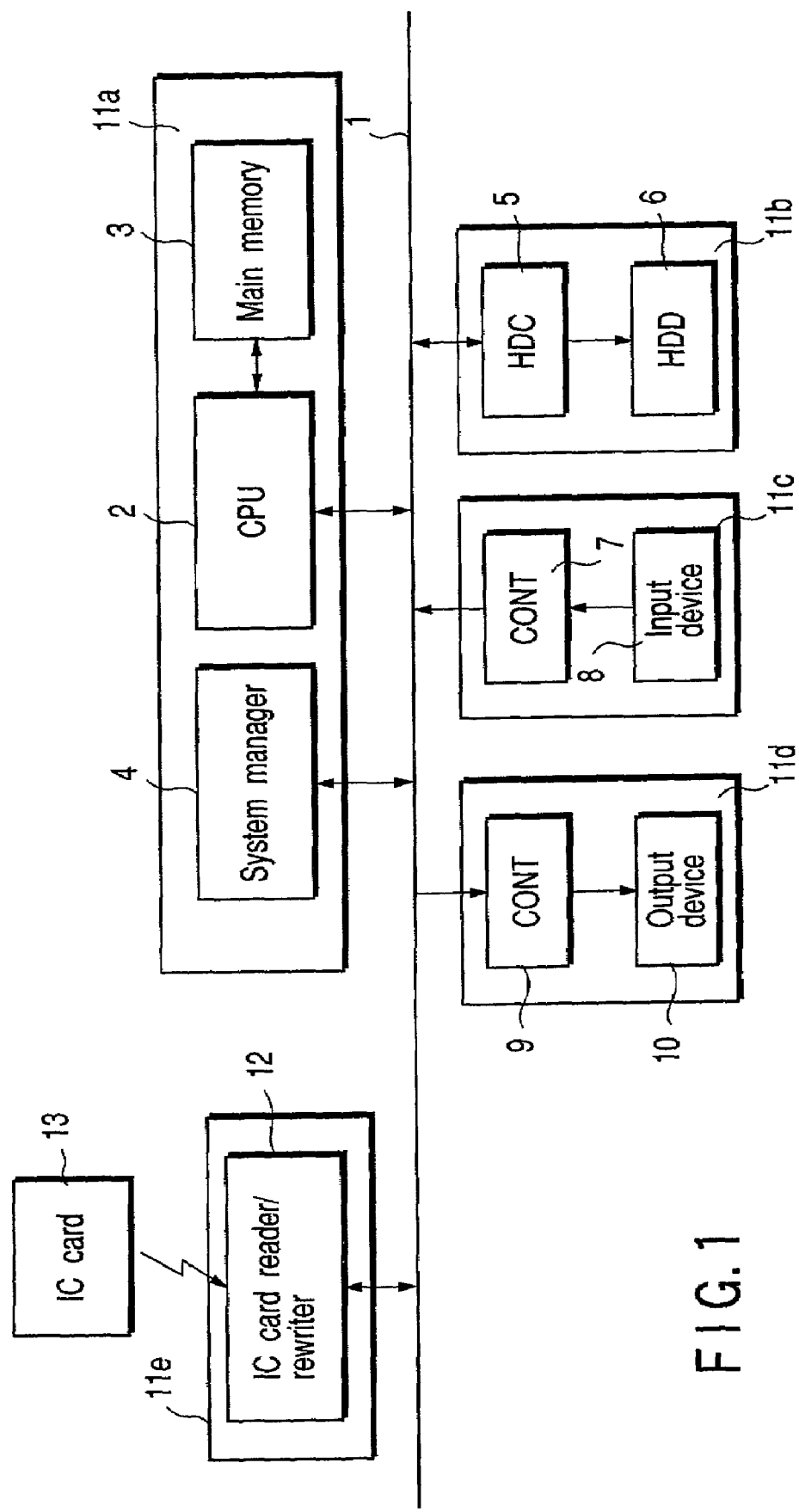
FIG. 1 is a block diagram showing a hardware management apparatus according to the first embodiment of the present invention.

FIG. 1 shows a hardware management apparatus according to the first embodiment of the present invention.

As shown in FIG. 1, a CPU 2, system manager 4, IC card reader/writer 12, hard disk controller (HDC) 5, controller 7 for an input device, and controller 9 for an output device are connected to a system bus 1.

The CPU 2 controls the entire system, and implements hardware management of this embodiment on the basis of a hardware management program stored in a main memory 3.

The system manager 4 manages the state (mount state) of a printed circuit board of the system.

The CPU 2, main memory 3, and system manager 4 are mounted on a single circuit board 11a.

The hard disk controller (HDC) 3 controls I/O of a hard disk drive (HDD) 6, and is mounted on a circuit board 11b.

The controller 7 for an input device controls an input device 8 such as a keyboard, mouse, or the like, and is, e.g., a keyboard controller. The controller 7 for an input device and the input device 8 are mounted on a circuit board 11c.

The controller 9 for an output device controls an output device 10 such as a display, printer, or the like, and is, e.g., a display controller. The controller 9 for an output device and the output device 10 are mounted on a circuit board 11d.

The IC card reader/writer 12 controls read/write of an IC card 13, and is mounted on a circuit board 11e.

FIG. 2 shows the system manager 4. As shown in FIG. 2, the system manager 4 has a system management information storage area 4a upon manufacture, and system management information storage area 4b after change.

Note that the system management information storage area 4a upon manufacture comprises a read-only nonvolatile memory, e.g., a mask read-only memory (MROM) or one time EPROM. The system management information storage area 4b after change comprises a rewritable nonvolatile memory, e.g., an EEPROM.

The system management information storage area 4a upon manufacture stores unique information indicating the system state upon manufacture. This unique information contains quality management information and function management information.

FIG. 3 shows information stored in the system management information storage area 4a upon manufacture.

As shown in FIG. 3, the quality management information registers the system manufacture number, manufacturer name, manufacture date, test program number upon delivery, system change history, system configuration device name, device change history, printed circuit board names that form the system, printed circuit board change history, and the like.

The function management information registers the system maximum operation speed, main memory size, external memory size, maximum transfer rate, and the like.

FIG. 4 shows information stored in the system management information storage area 4b after change.

As shown in FIG. 4, the system management information storage area 4b after change stores change management information. This change management information registers change information of the main memory size, that of connected devices, that of printed circuit boards, and the like. Note that the contents of this system management information storage area 4b after change are rewritable in accordance with an external instruction.

Figure 5:
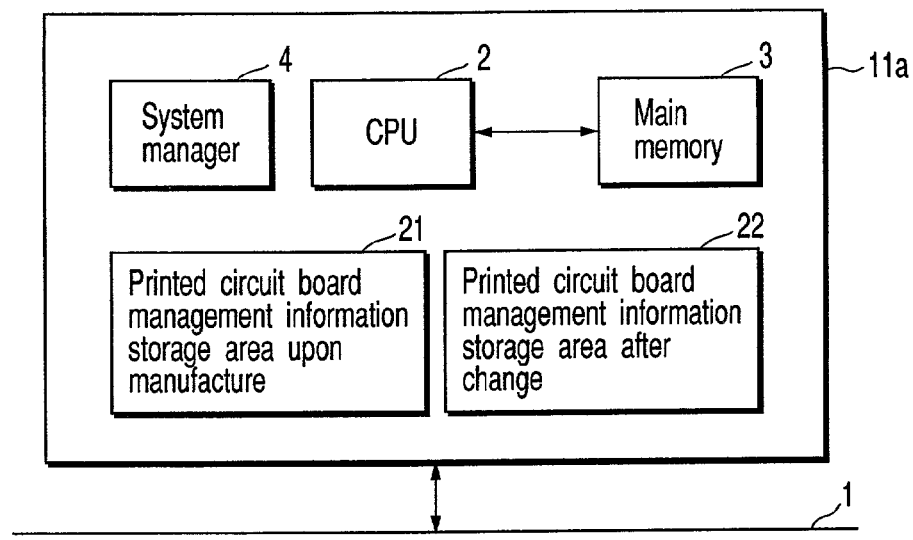
FIG. 5 is a diagram showing a printed circuit board 11a shown in FIG. 1.

FIG. 5 shows the printed circuit board 11a shown in FIG. 1.

As shown in FIG. 5, the printed circuit 11a has a printed circuit board management information area 21 upon manufacture, and printed circuit board management information area 22 after change.

Note that the printed circuit board management information area 21 upon manufacture comprises a read-only nonvolatile memory, e.g., a mask read-only memory (MROM) or one time EPROM. The printed circuit board management information area 22 after change comprises a rewritable nonvolatile memory, e.g., an EEPROM.

The printed circuit board management information area 21 upon manufacture stores unique information of a printed circuit board upon manufacture. This unique information contains quality management information and function management information.

Figure 6:
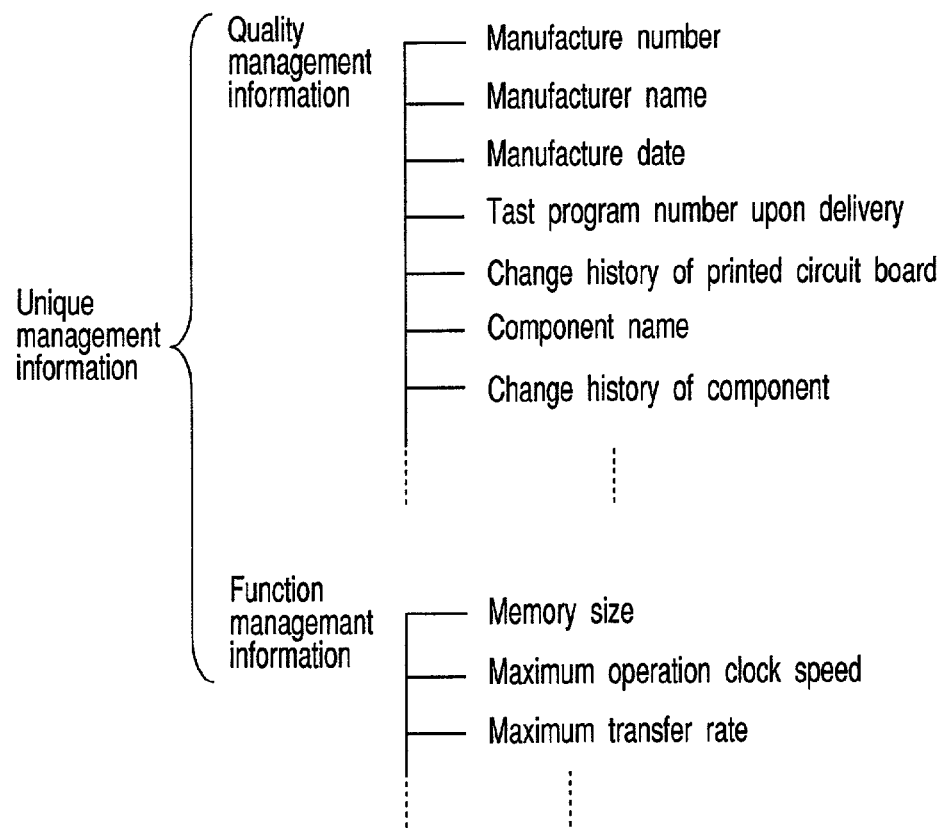
FIG. 6 shows an example of unique management information of the printed circuit board.

FIG. 6 shows information stored in the printed circuit board management information area 21 upon manufacture.

As shown in FIG. 6, the quality management information registers the manufacture number, manufacturer name, manufacture date, test program number upon delivery, change history, component names, change history of components, and the like of the printed circuit board.

The function management information registers the memory size, maximum operation clock speed, maximum transfer rate, and the like of the printed circuit board.

FIG. 7 shows information stored in the printed circuit board management information area 22 after change.

As shown in FIG. 7, the printed circuit board management information area 22 after change stores change management information. The change management information registers the expanded component names, expanded memory size, and the like. Note that the contents of this printed circuit board management information area 22 after change are rewritable on the basis of an external instruction.

In FIG. 5, the printed circuit board 11a has been described. Also, the printed circuit boards 11b to 11e respectively have printed circuit board management information areas upon manufacture and after change, which are used to manage components mounted on these printed circuit boards 11b to 11e, as in the printed circuit board 11a.

Also, a management information storage area is assured for each of functional elements which form a component such as a CPU or the like mounted on the printed circuit board.

FIG. 8 shows an example of a component such as a CPU or the like mounted on the printed circuit board.

As shown in FIG. 8, this component has as functional elements a microprocessor 31, ROM 32, RAM 33, DMA controller 34, I/O port 35, functional element management information storage area 36 upon manufacture, functional element management information storage area 37 after change, and timepiece module 38, which are connected to a bus 30.

Note that the functional element management information storage area 36 upon manufacture comprises a read-only nonvolatile memory, e.g., a mask read-only memory (MROM) or one time EPROM. The functional element management information storage area 37 after change comprises a rewritable nonvolatile memory, e.g., an EEPROM.

The functional element management information storage area 36 upon manufacture stores unique information indicating the states of functional elements upon manufacture. This unique information contains quality management information and function management information.

FIG. 9 shows information stored in the functional element management information storage area 36 upon manufacture.

As shown in FIG. 9, the quality management information registers the manufacture number, manufacturer name, manufacture date, test program number upon delivery, change history, functional element name, and the like of each functional element.

As the function management information, the contents of functional elements, e.g., the address width, data width, the number of interrupt ports, and the like are registered for the microprocessor 31; the memory size, I/O data width, access time, and the like for the ROM 33; and the number of channels for the DMA controller 34.

Figure 10:
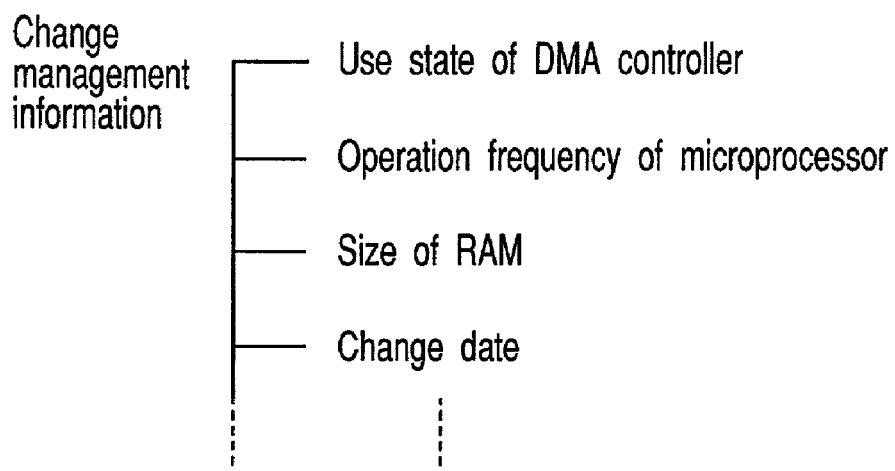
FIG. 10 shows information stored in a function element management information storage area 37 after change.

FIG. 10 shows information stored in the functional element management information storage area 37 after change.

As shown in FIG. 10, the functional element management information storage area 37 after change stores change management information. This change management information registers the use state of the DMA controller 34, the operation frequency of the microprocessor 31, the size of the RAM 33, and the like. Note that the contents of this functional element management information storage area 37 after change are rewritable on the basis of an external instruction.

Note that the component which includes the functional elements such as the microprocessor 31, ROM 32, and the like, as shown in FIG. 8, has been explained. Also, for components such as the CPU 2, the controller 9 for an output device, and the like shown in FIG. 1, functional element management information storage areas upon manufacture and after change are assured to manage functional elements that form these components.

Figure 11:
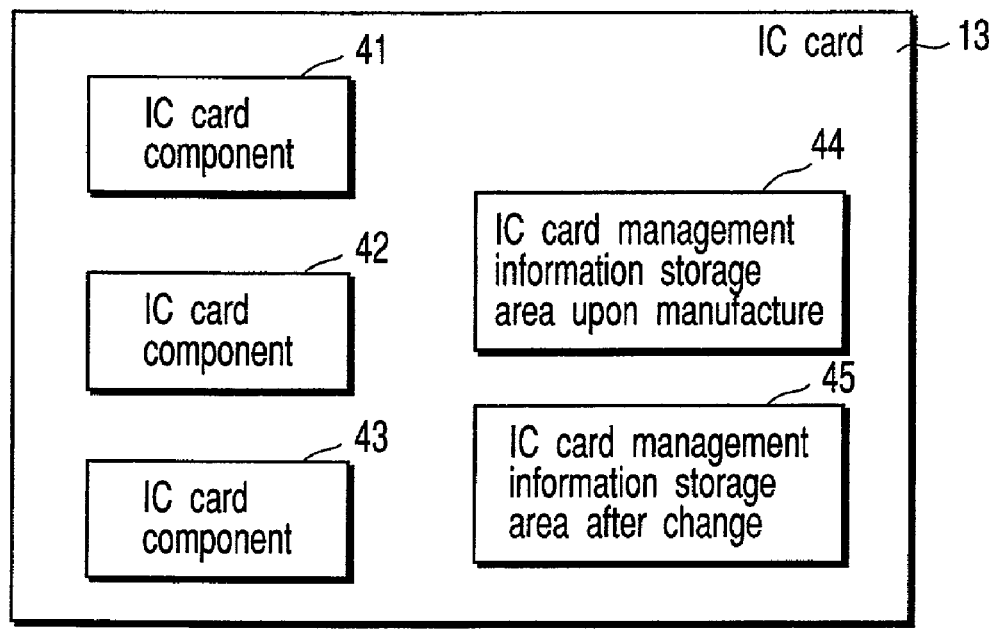
FIG. 11 is a diagram showing an IC card 13 shown in FIG. 1.

FIG. 11 shows the IC card 13 shown in FIG. 1.

As shown in FIG. 11, the IC card 13 has an IC card management information storage area 44 upon manufacture, and an IC card management information storage area 45 after change, which are used to manage IC card components 41 to 43 mounted on the IC card 13.

Note that the IC card management information storage area 44 upon manufacture comprises a read-only nonvolatile memory, e.g., a mask read-only memory (MROM) or one time EPROM. The IC card management information storage area 45 after change comprises a rewritable nonvolatile memory, e.g., an EEPROM.

The IC card management information storage area 44 upon manufacture stores unique information indicating the state of the IC card upon manufacture. This unique information contains quality management information and function management information.

The quality management information registers the manufacture number, manufacturer name, manufacture date, test program number upon delivery, change history of the IC card, component names, change histories of the components, and the like. Also, the function management information registers the memory size, maximum operation clock speed, maximum transfer rate, and the like.

The IC card management information storage area 45 after change stores change management information. This change management information registers the expanded component names, expanded memory size, and the like. Note that the contents of this IC card management information storage area 45 after change are rewritable on the basis of an external instruction.

Figure 12:
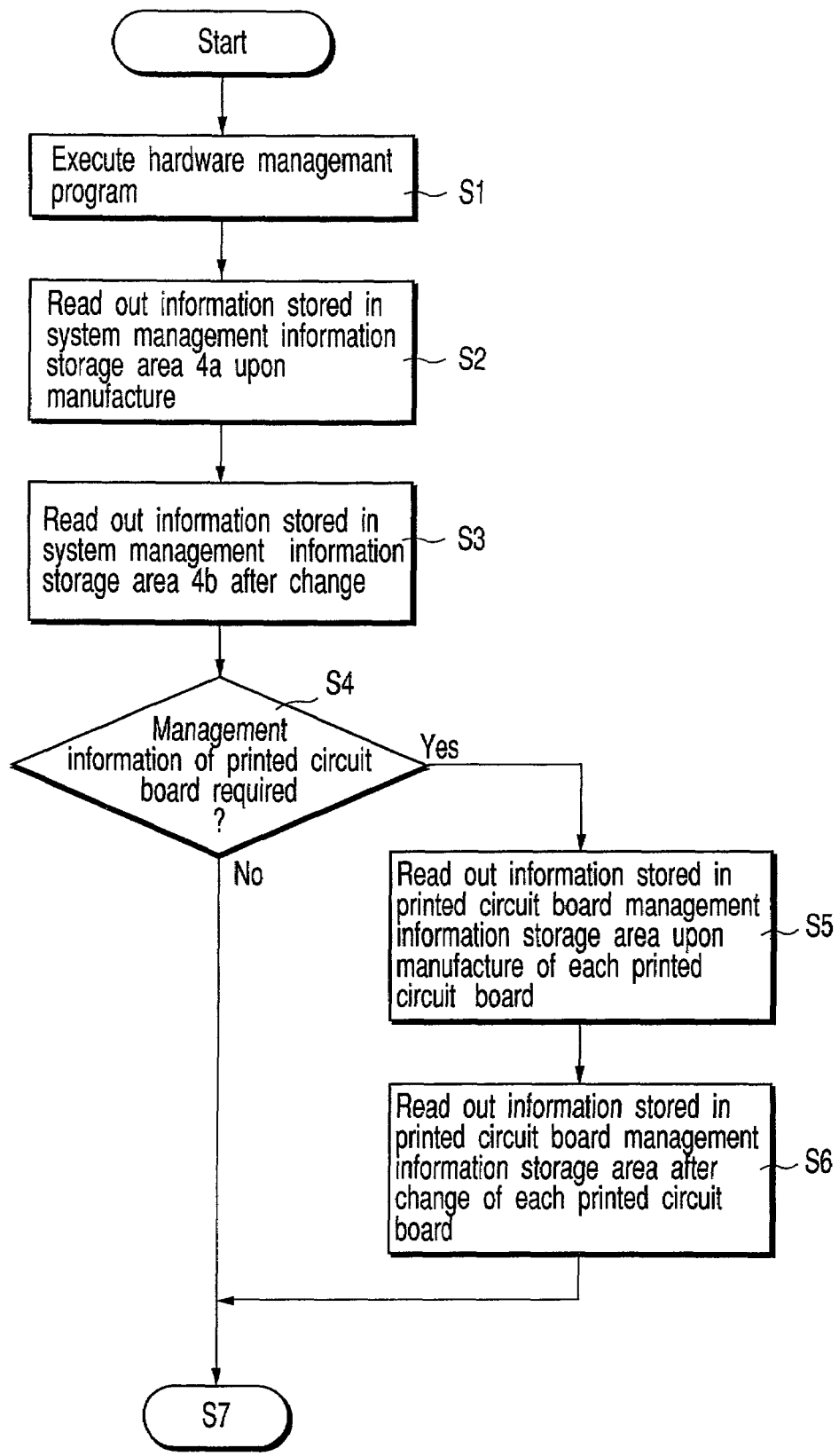
FIG. 12 is a flow chart for explaining the operation of the hardware management apparatus of the first embodiment.
Figure 13:
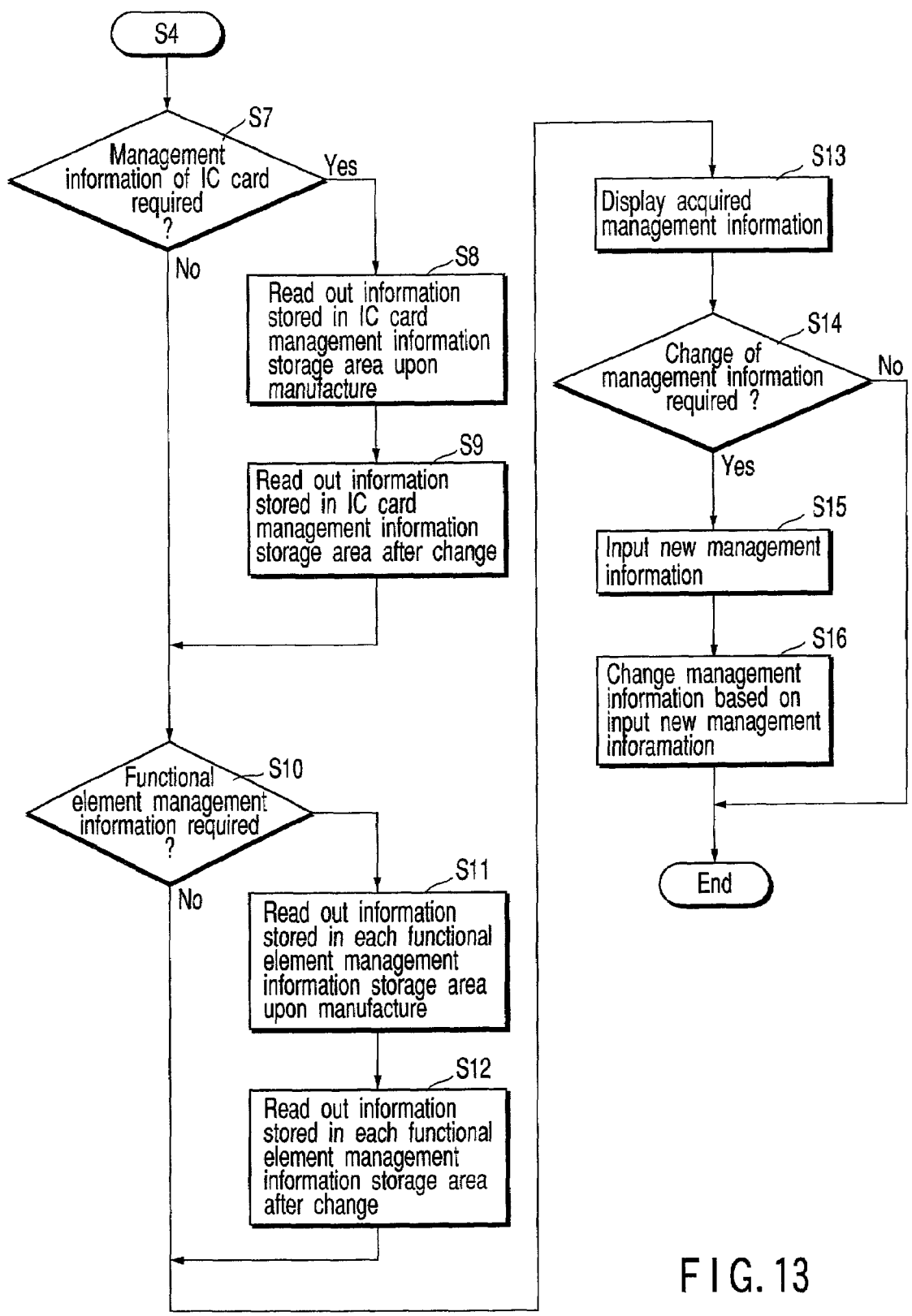
FIG. 13 is a flow chart for explaining the operation of the hardware management apparatus of the first embodiment.

The operation of the hardware management apparatus according to this embodiment will be described below with reference to the flow charts in FIGS. 12 and 13.

After the system is started up, the CPU 2 reads out and executes a hardware management program stored in the main memory 3 (S1).

The hardware management program reads out information stored in the system management information storage area 4*a* upon manufacture of the system manager 4 (S2), and then reads out information stored in the system management information storage area 4*b* after change (S3). In this manner, the unique management information shown in FIG. 3 and change management information shown in FIG. 4 of the system are acquired.

In this case, the hardware management program automatically reads out data stored in the system manager 4. Alternatively, as in the read-out process of management information of the printed circuit board and the like (to be described below), the user may be inquired as to whether or not management information stored in the system manager 4 is necessary, and if the user determines necessity, the information may be read out.

It is inquired of the user as to whether or not management information of each printed circuit board is required (S4).

If the user determines in step S4 that the information of the printed circuit board is required, information stored in the printed circuit board management information storage area upon manufacture of each printed circuit board is read out (S5). Then, information stored in the printed circuit board management information storage area after change of each printed circuit board is read out (S6). The flow then advances to step S7.

In this manner, the unique management information shown in FIG. 6 and change management information shown in FIG. 7 of each printed circuit board are acquired. In this case, all pieces of information stored in the printed circuit board management information storage areas upon manufacture and after change of all the printed circuit boards are read out. Alternatively, only management information of the printed circuit board designated by the user may be read out.

If the user determines in step S4 that the management information of each printed circuit board is not required, the flow advances to step S7.

It is inquired of the user in step S7 as to whether or not the management information of the IC card is required. If it is determined in step S7 that the management information of the IC card is required, information stored in the IC card management information storage area upon manufacture is read out (S8), and information stored in the IC card management information storage area after change is read out (S9). The flow then advances to step S10. In this way, information upon manufacture of the IC card, and information that pertains to the IC card after change are acquired. On the other hand, if the user determines in step S7 that the management information of the IC card is not required, the flow advances to step S10.

It is inquired of the user as to whether or not the functional element management information is required (S10). If the user determines in step S10 that the functional element management information is required, information stored in each functional element management information storage area upon manufacture is read out (S11), information stored in each functional element management information storage area after change is read out (S12). The flow then advances to step S13.

In this manner, the unique management information shown in FIG. 9 and change management information shown in FIG. 10 of each functional element are acquired. In this case, all pieces of information stored in the functional element management information storage areas upon manufacture and after change of all functional elements are read out. Alternatively, the management information of only a functional element designated by the user may be read out. On the other hand, if the user determines in step S10 that the functional element management information is not required, the flow advances to step S13.

In step S13, the acquired management information is displayed. If the user designates the management information of the printed circuit boards, management information is displayed, as shown in, e.g., FIG. 14. In this case, information is displayed on the screen, but may be output to, e.g., a printer.

The user checks based on the displayed screen if the management information need be changed (S14). If the external storage size of the actual system has been changed from 6 GB to 10 GB on the displayed screen shown in, e.g., FIG. 14, that change in external storage size is not recorded in the change management information. Hence, the user determines in step S14 that the management information need be changed, and inputs new management information indicating that the external storage size has been changed from 6 GB to 10 GB in the change management information of the system management information (S15).

The hardware management program changes the corresponding management information on the basis of the input new management information (S16). For example, when the maximum operation speed of the system shown in FIG. 1 is to be changed, change information of the maximum operation speed of the system is added to the change management information (FIG. 4) of the system manager 4.

When a component of the printed circuit board 11*a* of the system shown in FIG. 1 has been changed, change information of the component is added to the change management information of the printed circuit board 11*a*. Furthermore, when the maximum clock frequency of the CPU 2 as one of functional elements has been changed, change information of the maximum clock frequency is added to the change management information of the CPU 2.

In this manner, the hardware management apparatus of this embodiment manages management information for each of the system, printed circuit boards, and functional elements (CPU and the like), and saves change information in the corresponding management information storage area if a change has occurred.

Therefore, according to the hardware management apparatus of this embodiment, hardware information upon manufacture and that after change can be managed.

In this embodiment, hardware management information upon manufacture and that after change are provided to respective building components (system, printed circuit boards, functional elements). Alternatively, only management information upon manufacture may be provided to each building component, and the management information after change may be provided together to the system manager 4.

Second Embodiment

The recent advance in semiconductor technique has increased an information size that can be installed per unit conventional semiconductor area. Also, a semiconductor memory is mounted in a portable card, which is often used upon being attached to a portable terminal or personal computer.

For example, the user attaches a memory card that stores music information to a player to hear a music, or stores image data of pictures and the like in a memory card and attaches it to a display device to appreciate those pictures, or stores text data of a dictionary, book, or the like in a memory card to read displayed or printed text. However, most of these kinds of information have intellectual properties, and a mechanism for protecting such intellectual properties is required.

The present invention can be applied to protect information associated with such intellectual properties.

FIG. 15 shows a memory card registration apparatus for managing intellectual property information by attaching a memory card.

As shown in FIG. 15, a memory card registration apparatus 60 has a CPU 62, main memory 63, external storage device 64, memory card interface 65, input device 66, and output device 67, which are connected to a bus 61.

The CPU 62 controls the overall memory card registration apparatus.

The main memory 63 stores an application program to be executed by the memory card registration apparatus 60.

The external storage device 64 stores intellectual property information. Note that the intellectual property information indicates music information which requires permission to use copyrighted information.

The memory card interface 65 reads out information from a memory card 71, and writes information in the memory card 71.

The input device 66 comprises, e.g., a keyboard and can input information. The output device 67 comprises, e.g., a display, and outputs information.

FIG. 16 shows the information storage unit of the memory card 71.

As shown in FIG. 16, the memory card 71 comprises an intellectual property information addition/deletion unit 72, intellectual property information storage unit 73, unique management information storage unit 74, and management information storage unit 75. Note that the intellectual property information addition/deletion unit 72, intellectual property information storage unit 73, unique management information storage unit 74, and management information storage unit 75 comprise a nonvolatile memory.

In the first embodiment, the hardware management method has been explained. In this embodiment, the aforementioned method is expanded to management of intellectual property information.

The intellectual property information addition/deletion unit 72 stores added intellectual property information. Also, the added intellectual property information can be deleted.

The intellectual property information storage unit 73 stores unique intellectual property information upon manufacture.

The unique management information storage unit 74 stores unique management information of intellectual property information determined upon manufacture of the memory card 71. This unique management information contains, e.g., the presence/absence of copyrights, the copyright holder name, the payment destination name at the time of use, the access condition of intellectual property information (e.g., the number of times of a read, write permission condition), and the like.

The management information storage unit 75 stores management information and the like of the access condition of the intellectual property information stored in the intellectual property information storage unit 73, and the intellectual property information added to the intellectual property information addition/deletion unit 72.

For example, when the user accesses copyrighted intellectual property information from the intellectual property information storage unit 73, and when the access condition of the corresponding intellectual property information stored in the unique management information storage unit 74 requires payment in a given amount, and the user has paid the predetermined amount, the management information storage unit 75 registers information indicating that the predetermined amount has been paid.

On the other hand, when the user accesses copyrighted intellectual property information from the intellectual property information storage unit 73, and when the access condition of the corresponding intellectual property information stored in the unique management information storage unit 74 is limited by an access count and the user has paid a predetermined amount, the access count as a new access condition corresponding to the paid amount is stored in the management information storage unit 75.

Figure 17:
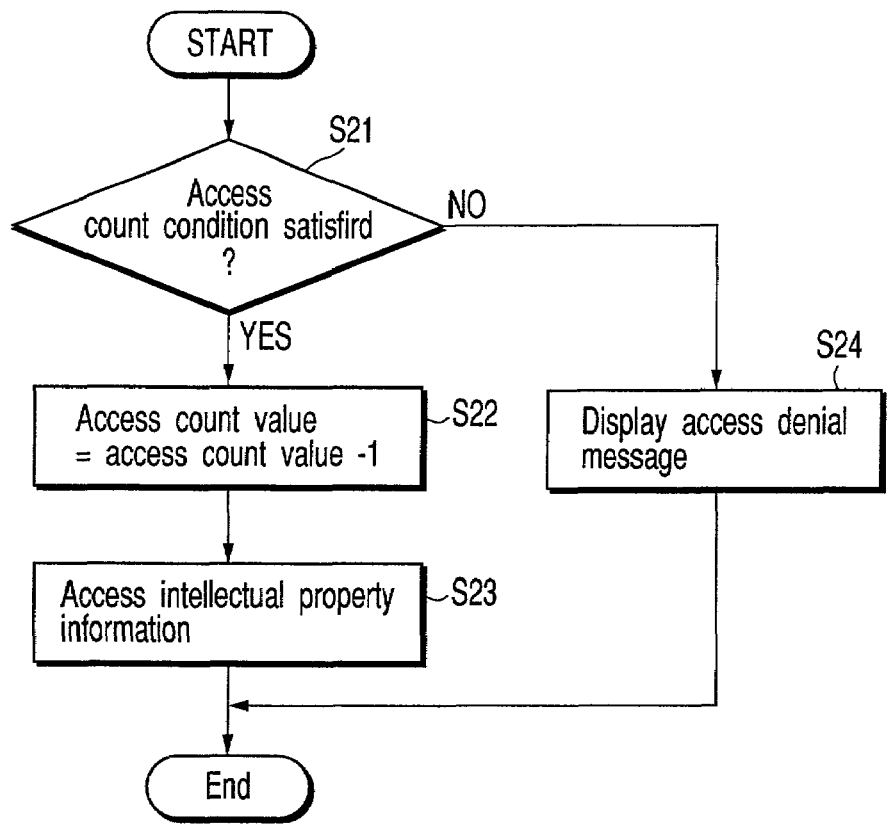
FIG. 17 is a flow chart for explaining the operation of the memory card registration apparatus.

The operation of the memory card registration apparatus according to the embodiment of the present invention will be described below with reference to the flow chart in FIG. 17. A case will be explained below wherein the access condition of intellectual property information is limited by the access count.

When the user accesses intellectual property information stored in the intellectual property information storage unit 73, it is checked if an access count condition as the access condition of the intellectual property information to be accessed is satisfied (S21).

An access count information upon manufacture is stored in the unique management information storage unit 74, and when the access count condition has changed, as will be described later, it is stored in the management information storage unit 75.

If it is determined in step S21 that the access count condition is satisfied, i.e., the access count value is not "0", 1 is subtracted from the access count value, and the intellectual property information stored in the intellectual property information storage unit 73 is accessed (S23). On the other hand, if it is determined in step S21 that the access count condition is not satisfied, an access denial message is displayed (S24), thus ending the processing.

Figure 18:
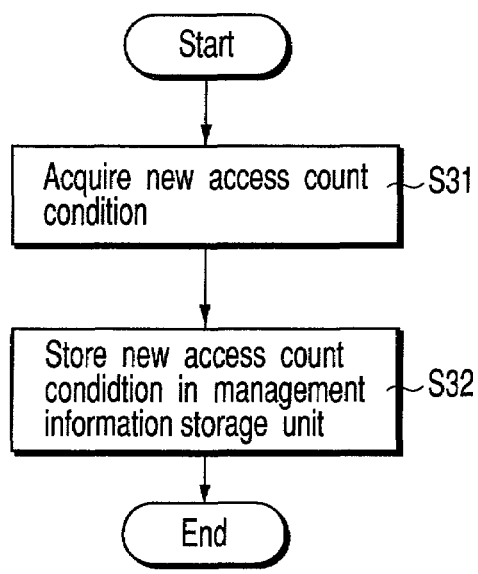
FIG. 18 is a flow chart for explaining the operation upon changing an access condition.

A case will be explained below with reference to the flow chart in FIG. 18 wherein the access condition is changed.

If the user acquires a new access count condition by, e.g., paying a given amount (S31), the acquired new access count condition is stored in the management information storage unit 75 (S32). The new access count condition is stored in the management information storage unit 75 using, e.g., a password issued upon acquiring the new access count condition. When the new access count condition acquired by, e.g., paying a given amount is stored in the management information storage unit 75, intellectual property information can be flexibly managed.

In the above description, the intellectual property information is managed using the access count. However, the present invention is not limited to this. For example, when the intellectual property information stored in the intellectual property information storage unit 73 is encrypted, the user acquires decryption information by, e.g., paying a given amount, and stores it in the management information storage unit 75. Upon accessing the encrypted intellectual property information, the encrypted intellectual property information is decrypted using the decryption information stored in the management information storage unit 75.

Furthermore, when the user acquires the right of access by, e.g., paying a given amount, intellectual property information may be downloaded from the external storage device 64 to the intellectual property information addition/deletion unit 72 of the memory card 71. Note that the intellectual property information may be downloaded not only from the external storage device but also from a server on the network. In this case, management information such as the right of access of the intellectual property information stored in the intellectual property information addition/deletion unit 72 and the like is stored in the management information storage unit 75.

Therefore, according to the memory card registration apparatus of this embodiment, since the memory card 71 comprises the management information storage unit 75 and unique management information storage unit 74 for managing intellectual property information, intellectual property information can be securely protected.

Note that the present invention is not limited to the aforementioned embodiments, and various modifications may be made without departing from the scope of the invention when it is practiced. The respective embodiments may be combined as needed as long as possible, and combined effects can be obtained in such case. Furthermore, the embodiments include inventions of various stages, and various inventions can be extracted by appropriately combining a plurality of required constituent elements disclosed in this application. For example, when an invention is extracted by omitting some required constituent requirements from all the required constituent elements disclosed in the embodiments, the omitted elements are compensated for by known techniques as needed upon practicing the extracted invention.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A hardware management apparatus comprising:
    at least one semiconductor integrated circuit component which comprises a plurality of semiconductor components, and a first memory for storing first management information used to manage mount states of said plurality of semiconductor components;
    at least one circuit board which comprises said at least one semiconductor integrated circuit component, and a second memory for storing second management information used to manage a mount state of said at least one semiconductor integrated circuit component; and
    a third memory for storing third management information used to manage a mount state of said at least one circuit board.

2. An apparatus according to claim 1, further comprising:
    management information change means for, when the mount states of said plurality of semiconductor components are changed, rewriting the first management information stored in said first memory to indicate changed mount states of said plurality of semiconductor components, for, when the mount state of said at least one semiconductor integrated circuit component is changed, rewriting the second management information stored in said second memory to indicate the changed mount state of said at least one semiconductor integrated circuit component, and for, when the mount state of said at least one circuit board is changed, rewriting the third management information stored in said third memory to indicate the changed mount state of said at least one circuit board.

3. An apparatus according to claim 1, further comprising an IC card having intellectual property information and a management area for storing fourth management information used to manage the intellectual property information, and
    wherein when a management method of the intellectual property information is changed, said management information change means rewrites the fourth management information stored in the management area to indicate the changed management information of the intellectual property information.

4. An apparatus according to claim 1, wherein the first memory includes a first information area storing information of the plurality of semiconductor components upon manufacture and a second information area storing information of the plurality of semiconductor components after change.

5. An apparatus according to claim 1, wherein the second memory includes a first information area storing information of the at least one circuit board upon manufacture and a second information area storing information of the at least one circuit board after change.

6. An apparatus according to claim 1,
    wherein the third memory includes a first information area storing information of the at least one circuit board upon manufacture and a second area storing information of the at least one circuit board after change.

* * * * *